No. 749,397. PATENTED JAN. 12, 1904.
N. E. NASH.
HEAT REGULATING APPARATUS.
APPLICATION FILED NOV. 8, 1902.
NO MODEL.
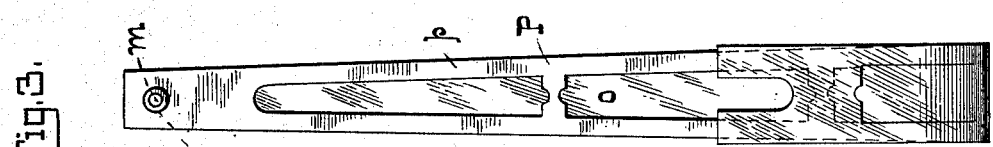
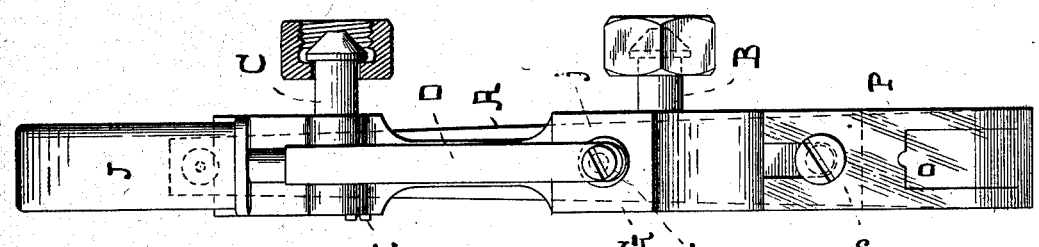
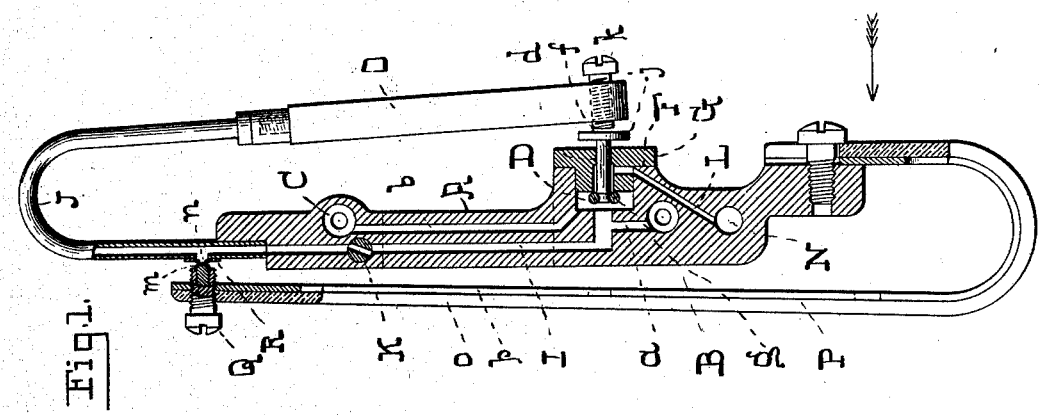
WITNESSES: A. O. Babendrier
H. C. Brittingham
INVENTOR: Nathan E. Nash
by W. T. Howard, Atty.

No. 749,397. Patented January 12, 1904.

UNITED STATES PATENT OFFICE.

NATHAN E. NASH, OF DETROIT, MICHIGAN.

HEAT-REGULATING APPARATUS.

SPECIFICATION forming part of Letters Patent No. 749,397, dated January 12, 1904.

Application filed November 8, 1902. Serial No. 130,527. (No model.)

*To all whom it may concern:*

Be it known that I, NATHAN E. NASH, of the city of Detroit, in the county of Wayne and State of Michigan, have invented certain Improvements in Heat-Regulating Apparatus, of which the following is a specification.

This invention relates to certain improvements in that class of heat-regulating apparatus in which the opening and closing of the radiator-valve or that valve which admits steam or hot water to a radiator is effected, primarily, by a thermostat which in its movement consequent upon a change in temperature opens or closes a minute air-exit aperture in the apparatus, and thereby controls the admission of air under pressure to a motor, whereby the radiator-valve is either opened or closed, as may be arranged with respect to the situation of a spring which serves to move the said valve in one direction. In apparatus of this description it is found necessary in order that the temperature of the room in which the thermostat is situated may be properly regulated so as to maintain a nearly uniform temperature that intermediary devices constituting a motor should be employed between the thermostat and the valve mechanism which controls the admission of air to the radiator-valve motor to give a greater movement to the said valve mechanism than the thermostat itself, and motors of various kinds have been devised for this purpose.

The present invention consists principally in the application of the principle of the Bourdon spring in the construction of an intermediary motor and controlling of the movement of the same by a thermostat.

It further consists in certain details of construction of the apparatus, as will hereinafter fully appear.

In the further description of the said invention which follows reference is made to the accompanying drawings, forming a part hereof, and in which—

Figure 1 is a central side section of the improved thermostatically-operated motor and its connections. Fig. 2 is an exterior view of the same looking in the direction indicated by the arrow. Fig. 3 is a view of the thermostat alone still looking in the direction indicated by the arrow.

Referring now to the drawings, A is a shell having the inlet and outlet nozzles B and C, adapted for connection by means of pipes respectively to a source of supply of air under pressure and the motor, (not shown,) whereby the radiator-valve is operated in one direction or that in which the said valve is closed. These nozzles are in communication by means of the channels $a$ and $b$ and a chamber D, leading to the face F of the shell, where it is closed by the plate G.

I is a passage leading from the channel $a$ to the upper end of the shell A, where it opens into one end of a Bourdon spring J.

The plate G is bored, and in the hole $d$ is inserted a loose stem $f$, having at its inner end a valve $g$, preferably of rubber, adapted to seat on the bottom of the chamber D and when so seated close the channel $a$, and thereby cut off all communication between the inlet and outlet nozzles B and C.

The outer end of the stem $f$ is provided with a head $j$, and the length of the stem is such that when the valve $g$ is seated on the bottom of the chamber B the head will not touch the outer surface of the plate G.

K is a valve or, more properly speaking, a cock-key which controls the passage I, and by means of it the said passage may be reduced in effective size.

L is a port leading from the chamber D to an escape-opening N in communication with the outer air.

O is a bar secured to the closed outer end of of the Bourdon spring J and extending downward to a point opposite the head $j$ of the stem $f$, where it is provided with an adjusting-screw $k$.

P is a thermostat formed by securing together two blades having different degrees of expansibility at a common temperature, fastened by means of a screw to the lower end of the shell A and extending upward to a point above the lower end of the Bourdon spring.

The two substances which I prefer to combine in the construction of the thermostat are porcelain and nickel, and in the drawings the porcelain element is represented by o and the nickel element by p, and in order that the porcelain may be exposed to the atmosphere at both its sides the nickel plate is cut away so as to be merely a skeleton, as shown particularly in Fig. 3.

Q is an adjusting-screw at the free end of the thermostatic blade, and in a cavity in its end is inserted a small piece of rawhide or some other joint-forming substance which constitutes a valve m, and at a point directly opposite this valve the adjoining wall of the Bourdon spring is perforated and is fitted with a nipple R, having an aperture n of an area which is greater than the effective area of the passage I.

The whole apparatus, as described, is covered by an ornamental open-work casing, whereby it is fastened to the wall of the room in which a uniform and predetermined temperature is to be maintained. This casing, however, is omitted from the drawings, as it embodies no part of the present invention.

Supposing the apparatus to be supplied with air under pressure, which when confined in the Bourdon spring causes it to distend and move the adjusting-screw k away from the head j of the valve-stem f, the operation of adjusting the apparatus is as follows: The required temperature of the atmosphere of the room having been decided upon and actually secured by opening the radiator-valve by means of its motor, the valve m at the end of the adjusting-screw Q is set so as to just close the aperture n in the nipple R and the adjusting-screw k turned until its point is just clear of the head j of the valve-stem f. The compressed air in the chamber D then causes the valve g to seat against the inner surface of the plate G and form a joint around the valve-stem f. In this movement of the valve g the channel a is uncovered, and the inlet and outlet nozzles being then in communication by means of the channels a and b and the chamber D compressed air passes to the radiator-valve motor and effects the closing of the radiator-valve, and steam being then shut off from the radiator further rise in the temperature of the room is prevented.

The relative positions of the various elements of the apparatus just described are maintained until the temperature in the room falls slightly, when upon the contraction of the porcelain element of the thermostat the thermostatic blade is thrown outward and the valve m withdrawn from the aperture n in the nipple R. This allows the compressed air contained in the Bourdon spring to escape or be reduced in pressure, owing to the outlet-aperture n in the nipple having a larger area than the effective area of the passage I, which supplies the spring, and the bar O in moving toward the shell A its adjusting-screw k strikes the head of the valve-stem f, which causes the valve g to seat over the channel a. The covering of the channel a by the valve g prevents further communication between the nozzles B and C and allows the escape of air from the radiator valve-motor through the pipe (not shown) leading to the nozzle C, channel b, chamber D, duct L, and the opening N. The said motor now being inoperative to keep the radiator-valve closed, the said valve opens by spring force and steam is readmitted to the radiator and the temperature of the room raised to the normal point, when steam is again shut off from the radiator, as described.

I claim as my invention—

1. In a heat-regulating apparatus, a motor for operating a valve forming a part of the said apparatus, comprising a Bourdon spring with one end thereof arranged to engage with and move the said valve, the said spring being provided with an escape-aperture, combined with means to effect the introduction of air under pressure to the other end of the said spring, a thermostat adapted, in changes in the temperature of the surrounding air, to open or close the said aperture, and thereby reduce or reestablish the original pressure within the said spring and so effect the operation of the said valve substantially as specified.

2. In a heat-regulating apparatus, a motor for operating a valve forming a part of the said apparatus, comprising a Bourdon spring with one end thereof arranged to engage with and move the said valve, the said spring being provided with an escape-aperture, combined with means to effect the introduction of air under pressure to the other end of the said spring, a thermostat carrying a valve adapted, in changes in the temperature of the surrounding air, to open or close the said aperture, and thereby reduce or reestablish the original pressure in the said spring and so effect the operation of the said valve, substantially as specified.

3. A heat-regulating apparatus which consists of a shell having therein a chamber in communication with the outer air by means of an inlet and an outlet channel, a passage leading from the said chamber to the upper end of the shell having a controlling-valve therein, and a port leading from the said chamber to the outer air, combined with a valve situated within the said chamber adapted to close the inlet-channel, and provided with a stem extending through the wall of the shell, a Bourdon spring having an escape-aperture in its wall, secured to the upper end of the shell and in communication with the valve-controlled passage, and with its lower or free end arranged to engage with the said valve-stem, a thermostatic blade carrying a valve to control the said escape-opening in the wall of the Bourbon spring, the whole being so arranged that when compressed air is admitted to the Bourdon spring and its escape-aperture closed by the valve carried by the thermostatic blade, the said spring will be distended and its free end moved away from the said valve-stem, substantially as, and for the purpose specified.

NATHAN E. NASH.

Witnesses:
 OREGON MILTON DENNIS,
 WM. T. HOWARD.